(12) United States Patent
Sachs et al.

(10) Patent No.: US 11,543,546 B2
(45) Date of Patent: Jan. 3, 2023

(54) SYSTEMS AND METHODS FOR LOCALIZED CALIBRATION

(71) Applicant: GE Precision Healthcare LLC, Wauwatosa, WI (US)

(72) Inventors: Jonathan Sachs, Haifa (IL); Elias Shalabi, Haifa (IL)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 344 days.

(21) Appl. No.: 16/941,205

(22) Filed: Jul. 28, 2020

(65) Prior Publication Data
US 2022/0035059 A1   Feb. 3, 2022

(51) Int. Cl.
*G01T 7/00* (2006.01)
*G01T 1/161* (2006.01)

(52) U.S. Cl.
CPC .............. *G01T 7/005* (2013.01); *G01T 1/161* (2013.01)

(58) Field of Classification Search
CPC ........ G01T 7/005; G01T 1/161; G01T 1/1648
See application file for complete search history.

(56) References Cited

U.S. PATENT DOCUMENTS

| | | |
|---|---|---|
| 2007/0232881 A1 | 10/2007 | Shai et al. |
| 2010/0193697 A1 | 8/2010 | Bal et al. |
| 2011/0147574 A1 | 6/2011 | Blevis et al. |
| 2011/0155900 A1 | 6/2011 | Amir et al. |
| 2018/0059270 A1 | 3/2018 | Hefetz et al. |
| 2018/0275293 A1 | 9/2018 | Hefetz et al. |

OTHER PUBLICATIONS

"Local energy scale map for Nano PETTM/CT system," IEEE Nuclear Science symposium Conference Record, 2009 (Year: 2009).*

* cited by examiner

*Primary Examiner* — David P Porta
*Assistant Examiner* — Meenakshi S Sahu
(74) *Attorney, Agent, or Firm* — The Small Patent Law Group LLC; Dean D. Small (57) ABSTRACT

A method is provided for updating a uniformity map of a detector. The detector defines a detector surface area. The method includes positioning a flood on a sub-portion of the detector surface area of the detector. The flood defines a flood area that is smaller than the detector surface area. Also, the method includes collecting counts from the flood for the sub-portion of the detector surface area. Further, the method includes updating an adjustment portion of the uniformity map using the counts collected for the sub-portion of the detector surface area, wherein the adjustment portion corresponds to at least a part of the sub-portion of the detector surface area.

20 Claims, 7 Drawing Sheets

SYSTEMS AND METHODS FOR LOCALIZED CALIBRATION

BACKGROUND

The subject matter disclosed herein relates generally to medical imaging systems, and more particularly to calibration of detectors.

In nuclear medicine (NM) imaging, such as single photon emission computed tomography (SPECT) or positron emission tomography (PET) imaging, radiopharmaceuticals are administered internally to a patient. Detectors (e.g., gamma cameras) capture the radiation emitted by the radiopharmaceuticals and this information is used, by a computer, to form images. The NM images primarily show physiological function of, for example, the patient or a portion of the patient being imaged.

Detectors used in NM imaging may have a relatively large (e.g., 50 centimeters×40 centimeters) field of view. The sensitivity of the detector may vary throughout the detector due to inconsistencies in the electronics, crystals, and/or collimators of detectors. Isotope specific extrinsic maps for high statistics data on detectors may be created and/or updated using flood sources that cover the entire detectors. Use of such large flood sources may be inconvenient or impractical for updating maps of detectors.

BRIEF DESCRIPTION

In accordance with an embodiment, a method is provided for updating a uniformity map of a detector. The detector defines a detector surface area. The method includes positioning a flood on a sub-portion of the detector surface area of the detector. The flood defines a flood area that is smaller than the detector surface area. Also, the method includes collecting counts from the flood for the sub-portion of the detector surface area. Further, the method includes updating an adjustment portion of the uniformity map using the counts collected for the sub-portion of the detector surface area, wherein the adjustment portion corresponds to at least a part of the sub-portion of the detector surface area.

In accordance with another embodiment, a method is provided for updating a uniformity map of a detector. The detector defines a detector surface area. The method includes positioning a flood on a sub-portion of the detector surface area. The method also includes collecting counts from the flood for the sub-portion of the detector surface area. Also, the method includes using the counts collected from the flood to make a local uniformity map, and normalizing the local uniformity map to provide a normalized local uniformity map. Further, the method includes updating the uniformity map by replacing an adjustment portion of the uniformity map with the normalized local uniformity map.

In accordance with another embodiment, a system is provided that includes a detector, a flood, and at least one processor. The detector defines a detector surface area. The flood is configured to be disposed proximate the detector, and defines a flood area that is smaller than the detector surface area. The at least one processor is operably coupled to the detector. The at least one processor is configured to collect counts from the flood for the sub-portion of the detector surface area, and to update an adjustment portion of a uniformity map for the detector using the counts collected for the sub-portion of the detector surface area.

DETAILED DESCRIPTION

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for use of a substantially smaller flood (e.g., substantially smaller than a detector being calibrated) to update uniformity maps for detectors. For example, a flood may be used to update a relatively small portion of a uniformity map.

In various embodiments, the flood may be slightly larger than the area to be updated, allowing definition of a border region that may be used to derive a normalization factor to be used when updating an existing map with newly acquired calibration information for a sub-portion of the existing map.

A technical effect of at least one embodiment includes improved ease and convenience of calibration (e.g., for detectors having a portion of which has been repaired or replaced). A technical effect of at least one embodiment includes reduced cost and time for re-calibrating detectors.

Figure 1:
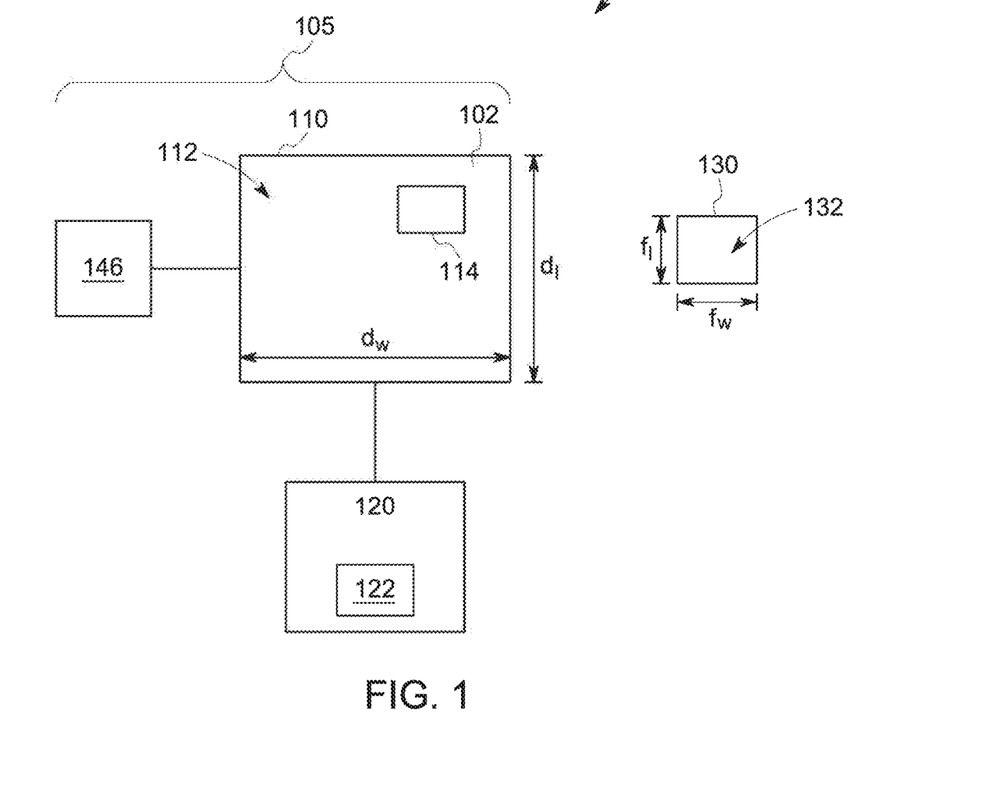
FIG. 1 provides a block schematic view of a system (e.g., for flood calibration) according to an embodiment.

FIG. 1 provides a schematic view of a flood system 100. The flood system 100 is used in various embodiments to re-calibrate a portion of a previously determined radiation uniformity map. The depicted flood system 100 includes a detector system 105 that includes a detector 110 and a processing unit 120, along with a flood 130. Generally, the detector 110 is configured to acquire imaging information of an object (e.g., human patient or portion thereof) being imaged, and the processing unit 120 is configured to use the imaging information to reconstruct an image of the object. The processing unit 120 may also be configured in various embodiments to control the detector 110 to acquire the imaging information.

Figure 2:
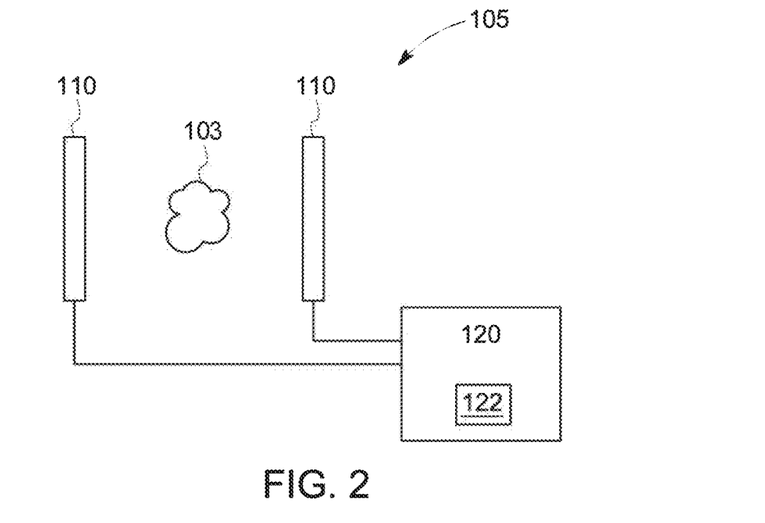
FIG. 2 illustrates a block schematic view of an imaging system.

It may be noted that more than one detector 110 may be utilized in various embodiments. For example, FIG. 2 depicts an example detector system 105 that includes two detectors 110. In the example depicted in FIG. 2, the detectors 110 are disposed on opposite sides of an object 103 to be imaged, and are configured to acquire emissions or radiation from the object 103. The detectors 110, for example, may be CZT detectors. For example, the object 103 may be a human patient (or portion thereof) that has been administered a radiopharmaceutical, with the detectors 110 acquiring or detecting resulting radiation emissions from the object 103. The detectors 110 may be configured for use with, for example, nuclear medicine (NM) imaging systems, positron emission tomography (PET) imaging systems, and/or single photon emission computed tomography (SPECT) imaging systems.

With continued reference to FIG. 1, the flood 130 is configured to be disposed proximate to the detector 110. For example, the flood 130 may be positioned against or nearly against a surface 102 of the detector 110 that is configured to receive radiation. Generally, the flood 130 is configured to provide a consistent amount of radiation to the detector 110 for calibration purposes. For example, in various embodiments the flood 130 is used to update a uniformity map for the detector 110 for calibration purposes. Use of the flood 130 for calibrating the detector 110 allows for inconsistencies or variances in detector performance over different portions of the surface 102 to be accounted for during use of the detector 110.

As seen in FIG. 1, the surface 102 of the detector 110 has a length dl and a width dw that define a detector surface area 112. Also, the flood has a flood length fl and a flood width fw that define a flood area 132. The flood area 132 is smaller than the detector surface area 112. Use of a smaller flood area 132 allows for a smaller, less expensive flood 130 that is easier to transport and position. For example, a portion of the detector 110 may be replaced or repaired on site (e.g., at a location where the detector 110 is used for an intended purpose), and that portion may need to be re-calibrated. Use of a flood 130 that is smaller than the detector 110 allows for re-calibration of only the portion that needs to be re-calibrated, while keeping the flood 130 at a smaller size that is more convenient to use on-site.

The processing unit 120 is operably coupled to the detector 110. When the flood 130 is activated and in place near the detector 110, the depicted processing unit 120 collects counts from the flood 130 for a sub-portion 114 of the detector surface area 112. The sub-portion 114 is defined by or corresponds to the flood area 132. The processing unit 120 is also configured to update an adjustment portion of a uniformity map for the detector 110 using the counts collected for the sub-portion 114 of the detector surface area 112.

In various embodiments the processing unit 120 includes processing circuitry configured to perform one or more tasks, functions, or steps discussed herein. It may be noted that "processing unit" as used herein is not intended to necessarily be limited to a single processor or computer. For example, the processing unit 120 may include multiple processors, ASIC's and/or computers, which may be integrated in a common housing or unit, or which may distributed among various units or housings. It may be noted that operations performed by the processing unit 120 (e.g., operations corresponding to process flows or methods discussed herein, or aspects thereof) may be sufficiently complex that the operations may not be performed by a human being within a reasonable time period. For example, acquiring counts, normalizing counts, and updating a uniformity map may rely on or utilize computations that may not be completed by a person within a reasonable time period.

In the illustrated embodiment, the processing unit 120 includes a memory 122. It may be noted that various aspects of the processing unit 120 described herein may be utilized in connection with various modules of the processing unit 120. Generally, the various aspects of the processing unit 120 act individually or cooperatively with other aspects to perform one or more aspects of the methods, steps, or processes discussed herein.

The memory 122 may include one or more computer readable storage media. The memory 122, for example, may store information describing previous calibration results, such as a previous or current uniformity map. Further, the process flows and/or flowcharts discussed herein (or aspects thereof) may represent one or more sets of instructions that are stored in the memory 122 for direction of operations of the system 100.

Figure 3:
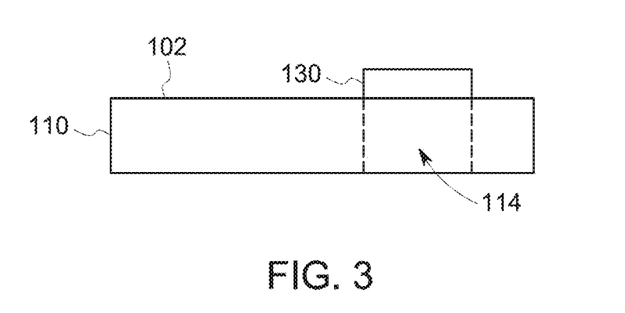
FIG. 3 shows orientation side view of the system of FIG. 1.
Figure 4:
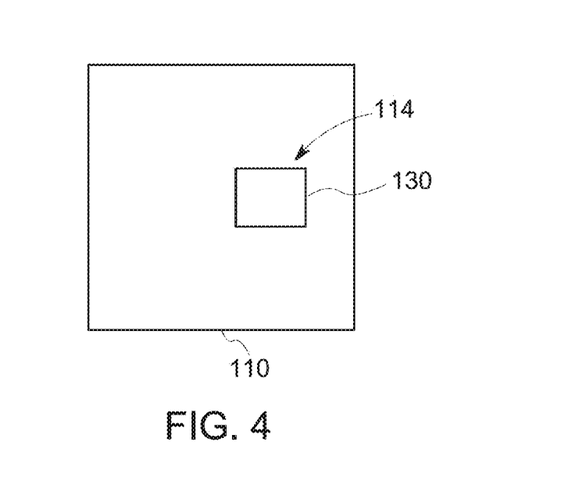
FIG. 4 shows an overhead view of the system of FIG. 1.

FIG. 3 shows a side view, and FIG. 4 shows an overhead view, of an example of the system 100 of FIG. 1 with the flood 130 positioned for use in calibrating (e.g., updating a uniformity map) of the detector 110. In the illustrated example, the detector 110 is position oriented upward, with the surface 102 configured to receive radiation oriented upward. The flood 130 is positioned at rest on top of the detector 110 and against the surface 102. With the flood 130 in place and emission from the flood 130 received by the detector 110, the portion of the detector 110 receiving radiation may be displayed on the display unit 140 (see FIG. 1.) For example, a known, desired position of the flood 130 may be indicated on the display unit 140, and the flood 130 adjusted in position until the received radiation displayed on the display unit 140 matches the desired position. With the flood 130 in the desired position, events may be counted and the uniformity map updated as discussed herein.

Figure 5:
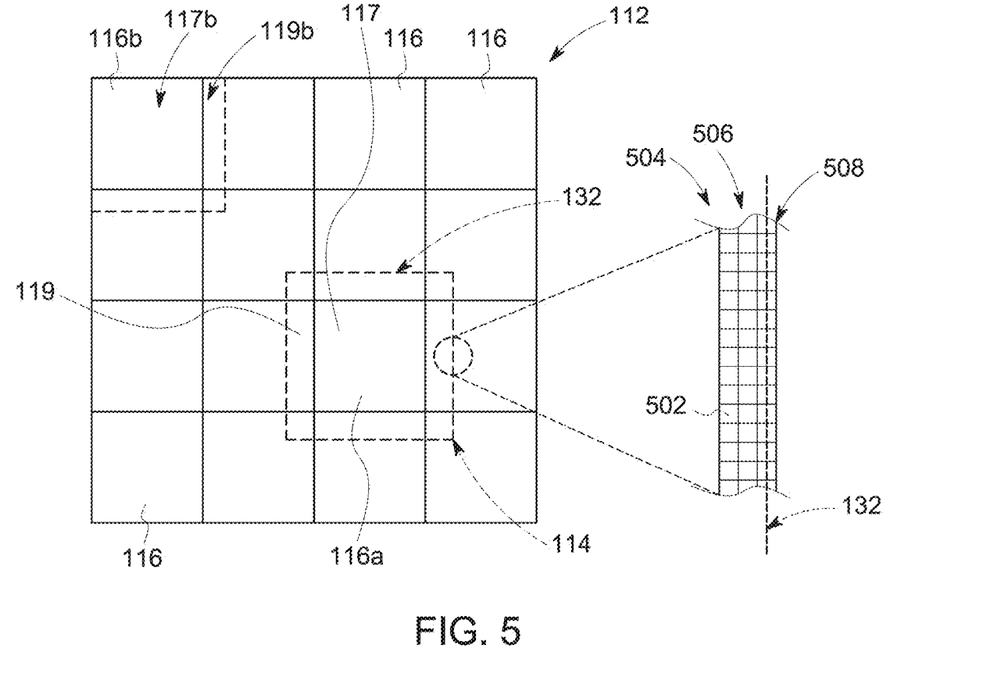
FIG. 5 shows a schematic view of a detector surface.

As discussed herein, the processing unit 120 is used to update an adjustment portion of a uniformity map. FIG. 5 illustrates a plan view of a detector 110 that includes modules 116. In various embodiments, the detector 110 comprises modules 116, with each module defining a corresponding portion of the detector surface area 112, with the adjustment portion corresponding to at least one module 116. For example, a given module 116a may be replaced, and the adjustment portion of the uniformity map is the part of the uniformity map corresponding to the module 116a. In various embodiments, each module 116 is separately wired or electrically connected to the processing unit 120, and includes an array of pixelated anodes. Accordingly, each module may be replaced while leaving other modules in place.

In the example of FIG. 5, module 116a has been replaced, and the flood 130 is positioned to provide radiation to the module 116a. As seen in FIG. 5, the flood area 132 (in dashed lines) is larger than the surface area of the module 116a. Accordingly, the sub-portion 114 of the detector 110 receiving radiation (and for which counts will be collected) is larger than the surface area of the module 116a. The sub-portion 114 may be understood as including two portions—an adjustment portion area 117, and a border area 119. The adjustment portion area 117 is the area within the solid lines denoting the boundary of the module 116a, and the border area 119 includes the area between the solid lines denoting the boundary of the module 116a and the dashed lines defining the boundary of the flood area 132. In various embodiments, the uniformity map is updated for the adjustment portion area 117 (e.g., module 116a), with counts from the border area 119 used to normalize the counts for the adjustment portion area 117 for updating the uniformity map as discussed herein. Accordingly, a flood 130 having a smaller surface area than the detector 110 may be used, and the uniformity map for the entire detector may remain largely unchanged, with only the portion corresponding to the module that was repaired or replaced changed. It may be noted that the border region may not necessarily be uniformly distributed about the adjustment area portion. For example, for corner module 116b, with an adjustment portion area 117b corresponding to the area of the corner module 116b, the border area 119b may be disposed on only 2 sides of the corner module 116b. It may be noted that, in various, embodiments, the border area may be generalized to refer to the unchanged portion of the detector or uniformity map within the region of the flood. This generalization enables replacing any number of modules fully contained within the flood region, as long as a "border" region of adequate area is also present.

As discussed herein, the border area 119 may be used to normalize counts collected for the adjustment portion area 117. It may be noted that some parts of the border area 119 may be discarded or excluded when determining counts for the border area 119 that will be used to normalize counts for the adjustment portion area 117. For example, in the illustrated example, as best seen in the enlarged portion toward the right of FIG. 5, the border area includes rows of pixels 502—a first row 504 located immediately adjacent the adjustment portion area 117, and second row 506 located next to the first row 504, and a third row 508. The third row 508 is the outermost row of the pixels 502 of the border area 119. The dashed line marking the boundary of the border area 119 passes through an intermediate portion of the pixels 502 in the third row 508, resulting in those pixels receiving less radiation than other pixels. Accordingly, in some embodiments, the pixels in the outermost row of the border area are discarded or excluded when performing normalization.

Figure 6:
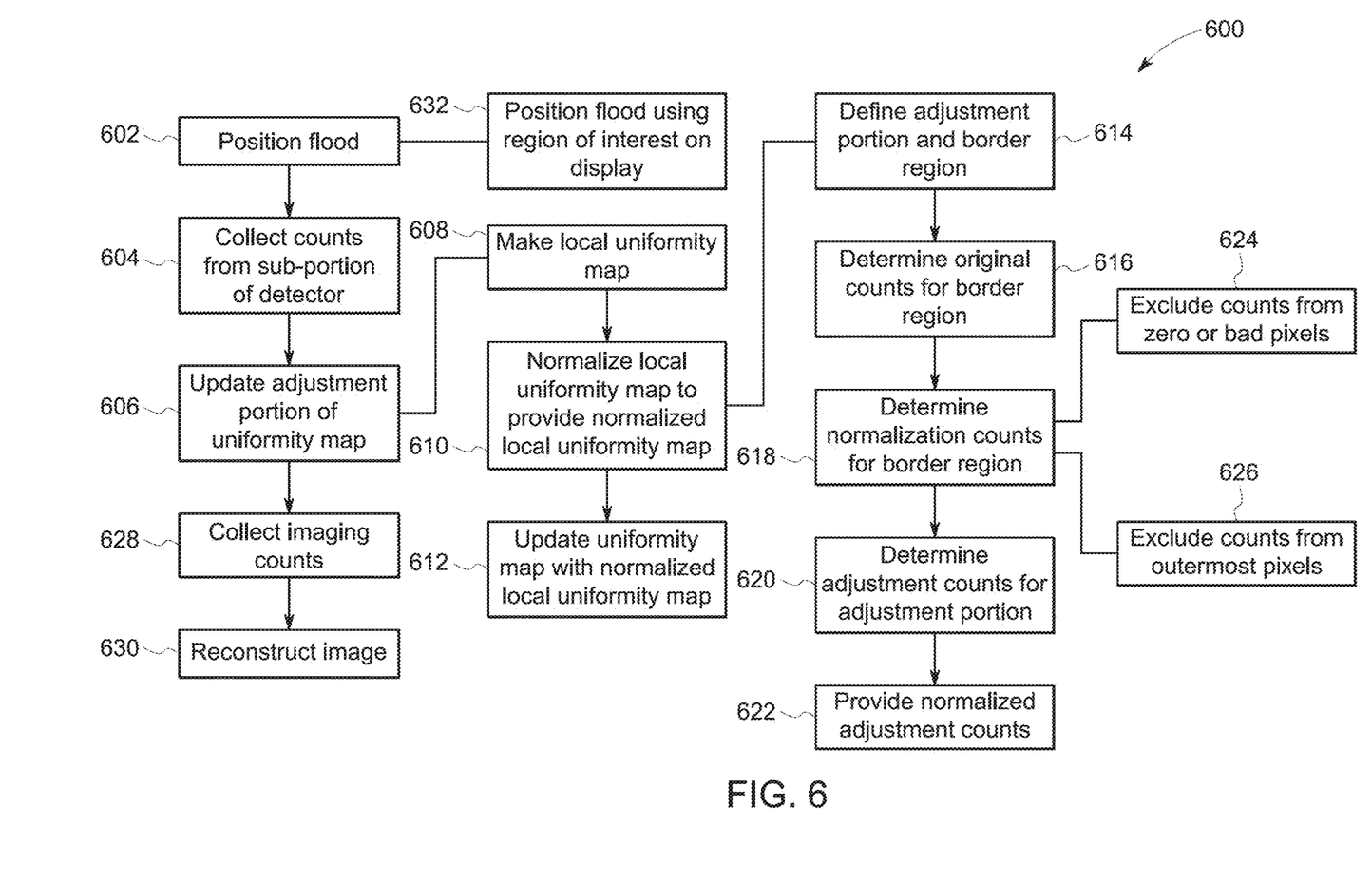
FIG. 6 shows a flowchart of a method, according to an embodiment.

FIG. 6 provides a flowchart of a method 600 (e.g., for calibrating a detector), in accordance with various embodiments. The method 600, for example, may be used to update a uniformity map for a detector (e.g., detector 110) that defines a surface area (e.g., detector surface area 112). The method 600, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 600 may be able to be used as one or more algorithms to direct hardware (e.g., one or more aspects of the processing unit 120) to perform one or more operations described herein.

At 602, a flood (e.g., flood 130) is positioned on a sub-portion of the detector surface area of the detector. Generally, the flood is configured to provide a uniform distribution of radiation for calibrating the detector. The flood defines a surface area that is smaller than the detector surface area. Accordingly, the flood is used to calibrate only a portion of the detector, for example a single module or group of modules being replaced. Use of a flood smaller than the detector allows for convenient, efficient calibration. In the illustrated example, the flood is used with the detector located on site at a location where the detector is used for its intended purpose (e.g., medical imaging of human patients). The detector, before installation on site, has a pre-determined uniformity map that defines the relative sensitivities of different locations (e.g., pixels) of the detector surface area. The uniformity map is used to correct or adjust recorded counts to account for variances of the different locations of the detector. In various embodiments, the uniformity map is used to correct or adjust counts on a per-pixel basis. In the illustrated example, at 632, the flood is positioned using a region of interest identified on a display (e.g., display unit 140) operably coupled to the detector. For example, the region of interest may be identified based on a particular module (or other portion) of the detector being replaced, with the region of interest highlighted or otherwise indicated on the display. Then, the flood may be used to irradiate the detector, with the radiation from the flood displayed on the display along with the region of interest. The position of the flood on the detector may then be adjusted as appropriate until the flood provides radiation to the entire region of interest (e.g., the displayed radiation from the flood overlaps with the pre-identified region of interest on the display).

At 604, counts are collected from the flood for the sub-portion of the detector surface area. The detector in various embodiments is configured to generate counts responsive to the reception of radiation. The detector may include a number of pixelated anodes, and the counts may be generated, for example, on a per-pixel basis. The counts may be collected over a pre-determined amount of time, or as another example, until a threshold number of counts have been collected.

At 606, an adjustment portion of the uniformity map is updated. The adjustment portion is updated using the counts collected for the sub-portion of the detector surface area for which the flood has been positioned to provide radiation. The adjustment portion corresponds to at least a part of the sub-portion of the detector surface area. In various embodiments, the adjustment portion defines an adjustment area that is smaller than the flood area. For example, the sub-portion of the detector surface area may include an adjustment portion area (e.g., adjustment portion area 117) and a border area (e.g., border area 119). The collected counts may be analyzed as adjustment counts from the adjustment portion area, and border counts from the border area. Then, the border counts may be used to normalize the counts collected for the adjustment portion (e.g., with respect to corresponding counts from the original uniformity map or uniformity map being updated) to provide normalized adjustment counts. The normalized adjustment counts may then be used to update the adjustment portion of the uniformity map.

In the illustrated example, at 608, the counts collected from the flood are used to make a local uniformity map. The local uniformity map, for example, may be for an adjustment area portion (e.g., adjustment area portion 117) that corresponds to a portion of the detector being repaired or replaced, and/or to a portion of a uniformity map to be updated. The counts may be collected on a per-pixel basis and used to provide a local uniformity map based on the counts received for each particular pixel of the adjustment area portion.

At 610, the local uniformity map is normalized to provide a normalized local uniformity map. The local uniformity map in various embodiments is normalized using counts from an area of the sub-portion of the detector receiving radiation from the flood compared to counts from a corresponding area in the original uniformity map.

Various techniques may be employed in different embodiments to normalize the local uniformity map. In the illustrated embodiment, at 614, an adjustment portion (e.g., corresponding to adjustment portion area 117) and a border region (e.g., corresponding to border area 119) are defined. The adjustment portion is defined based on the portion of the uniformity map to be updated. For example, the adjustment portion may be defined by a known portion of the detector being replaced, such as least on module. The location of each module on the uniformity map may be known a priori, so that by identifying the particular module (or modules) being replaced, the corresponding location on the uniformity map may be identified. The border region is defined to at least partially surround the adjustment portion. Accordingly, the adjustment portion corresponds to a portion of the detector being replaced, while the border region corresponds to neighboring portions that are not being replaced. As discussed herein, the local uniformity map is normalized using counts from the border region in various embodiments.

At 616, original counts (Co) are determined for the border region. The original counts are determined using the original version of the uniformity map, or the uniformity map to be updated. At 618, normalization counts (CO are determined. The normalization counts are determined using counts collected from the flood (e.g., at step 604) for the border region. The counts collected from the border region may be adjusted from the total counts collected for the border region when determining the normalization counts. For example, at 624, counts from at least one of bad pixels or zero pixels are excluded. Zero pixels (pixels which do not register counts) or bad pixels (pixels known to have a defect or flaw) may be identified beforehand and eliminated to improve the accuracy of the collected counts. As another example, at 626, counts from outermost pixels of the border regions are excluded. In various embodiments, the border region may include a number of rows of pixels outside of the portion of the detector being replaced. Depending on the positioning of the flood with respect to the portion of the detector being replaced, the outer edge of the border area or border region may not align exactly with the outer edge of pixels, resulting in the outermost row of pixels of the border region being only partially irradiated by the flood. Accordingly, the outermost rows of the border region may be identified and removed from consideration when determining the counts used for normalization.

At 620, adjustment counts (CA) are determined for the adjustment portion. The adjustment counts are determined based on the counts collected for the adjustment portion from the flood (e.g., at step 604). The adjustment counts may also be represented as a local uniformity map L that corresponds to the adjustment counts organized, for example, on a per pixel basis. Next, at 622, normalized adjustment counts (CN) are provided. The normalized adjustment counts are provided by multiplying the adjustment counts for the adjustment portion by a ratio defined by the original counts for the border region divided by the normalization counts for the border region, or Co/CL. The normalized adjustment counts may be represented by a normalized local uniformity map N, with N=L*(Co/CL).

After the normalized local uniformity map has been generated, at 612, the uniformity map is updated with the normalized local uniformity map. For example, the normalized local uniformity map may be used as a patch used to replace a corresponding patch on the uniformity map.

At 628, with the portion of the detector replaced and the uniformity map updated, imaging counts are collected with the detector during an imaging procedure. At 630, an image is reconstructed using the imaging counts and the updated uniformity map.

Figure 7:
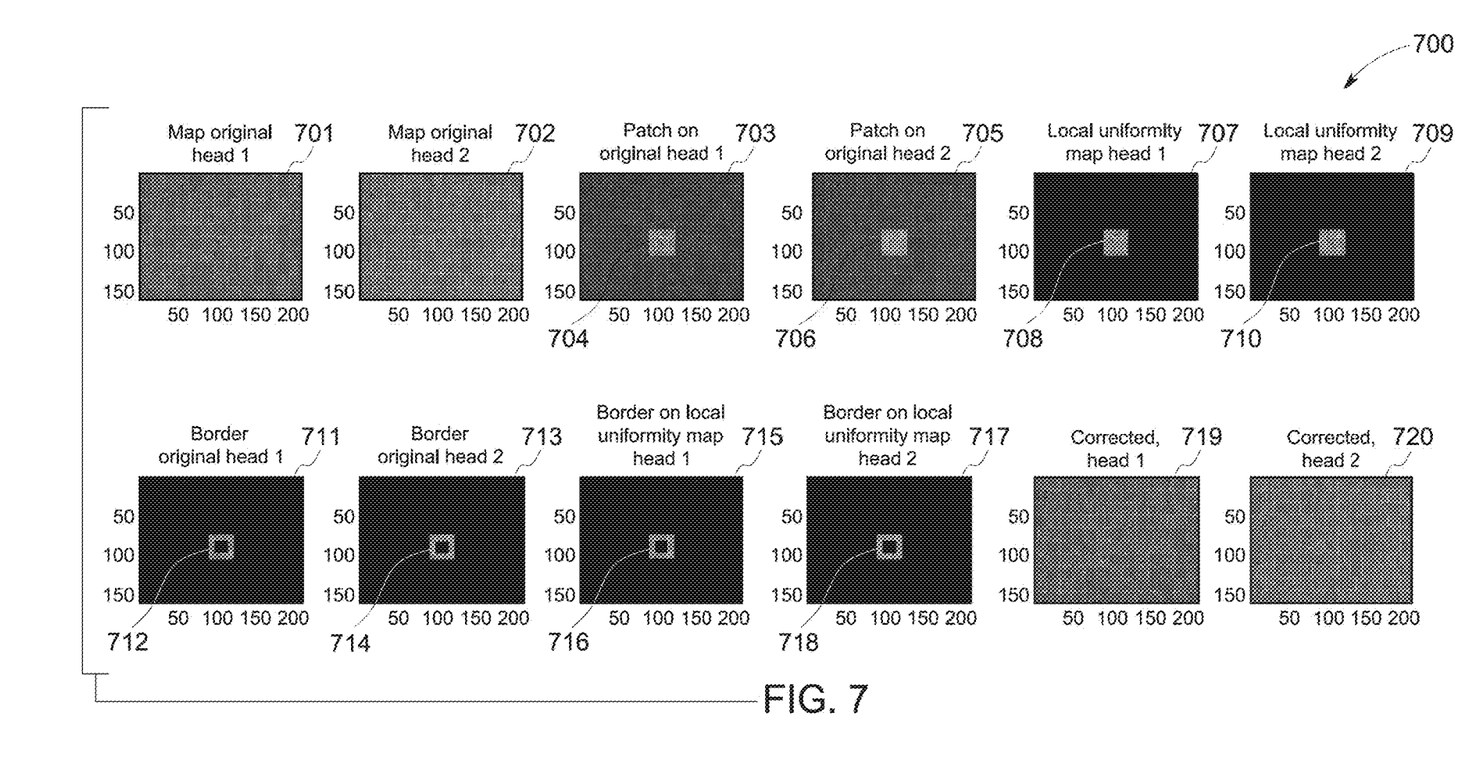
FIG. 7 shows a series of uniformity maps, according to an embodiment.

FIG. 7 illustrates a series of uniformity maps 700, which may be utilized in connection with and/or generated using the method 600. The series of uniformity maps 700 are for two detectors oriented toward each other with the flood interposed between the detectors, allowing two detectors to be updated at once.

An original uniformity map 701 for the entire detector for the first head, and an original uniformity map 702 are shown in FIG. 7. A patch or location to be updated may next be determined (e.g., based on a portion of a detector being repaired or replaced, such as a particular module being repaired or replaced). Map 703 shows the original uniformity map 701 with a patch 704 to be updated identified, and map 705 shows the original uniformity map 702 for the second detector with a patch 706 to be updated.

A local uniformity map 707 for a sub-portion 708 irradiated on the first detector is next shown in FIG. 7, along with a local uniformity map 709 for a sub-portion 710 irradiated on the second detector. Counts from these sub-portions may be used to update the original uniformity maps.

In the illustrated example, map 711 depicts counts for the border region 712 (corresponding to a border of sub-portion 708) from the original uniformity map of the first detector, and map 713 depicts counts for the border region 712 (corresponding to a border of sub-portion 710) from the original uniformity map of the second detector. Also, map 715 shows corresponding counts for the border region 716 from the local uniformity map 707 of the first detector, and map 717 shows corresponding counts for the border region 718 from the local uniformity map 709 of the second detector. The counts from the local uniformity maps 707, 709, may then be used to update the original uniformity maps 701, 702, with the counts from the local uniformity maps 707, 709 normalized using a comparison of the border region counts 712, 714 from the original uniformity maps with the border region counts 716, 718 from the local uniformity maps. Map 719 shows an updated uniformity map for the first detector, and map 720 shows an updated uniformity map for the second detector.

Figure 8:
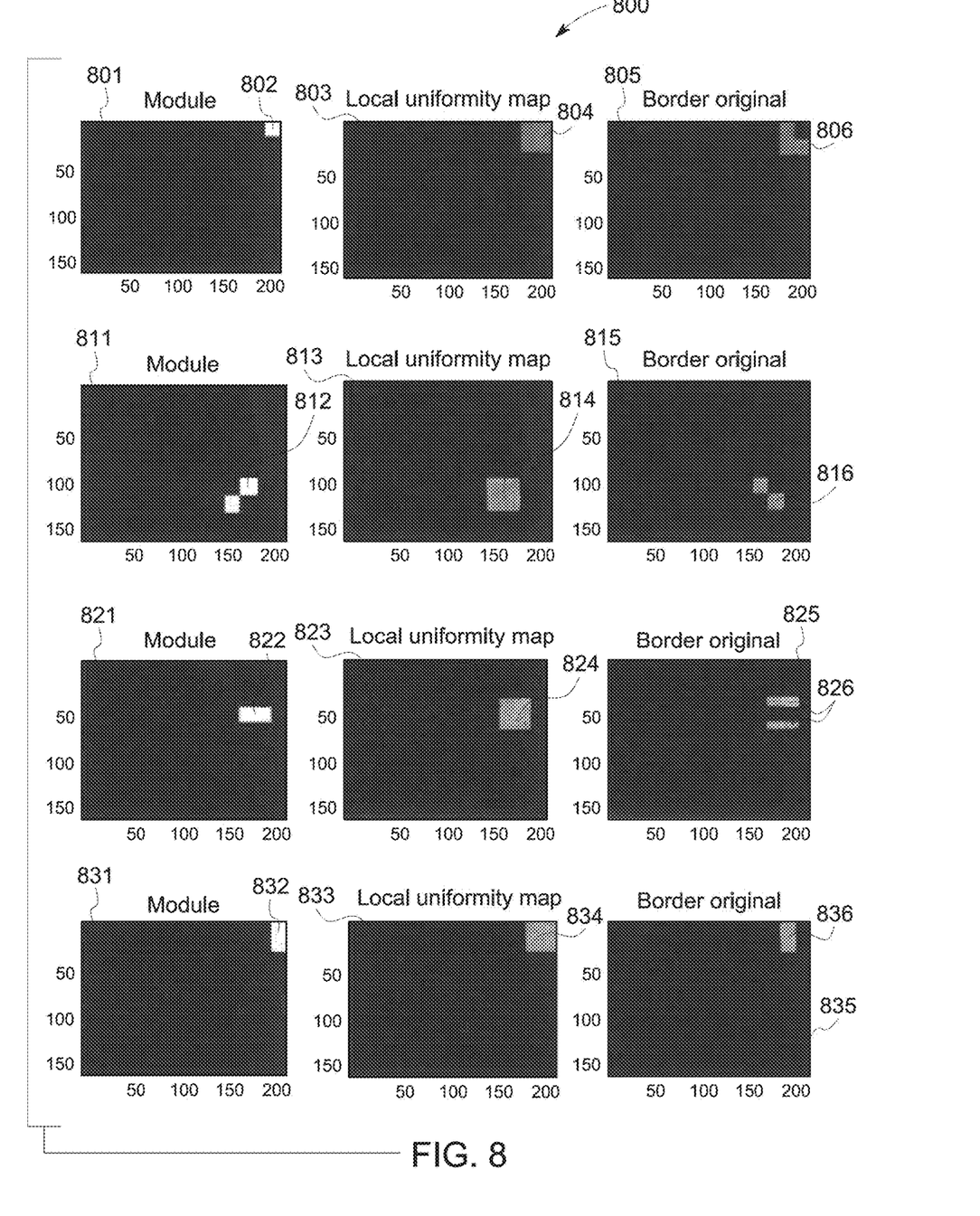
FIG. 8 shows a series of uniformity maps, according to an embodiment.

FIG. 8 illustrates a series of uniformity maps 800, which may be utilized in connection with and/or generated using the method 600. The uniformity maps 800 show various example relationships between border areas and module areas being replaced. Generally, for the examples of FIG. 8, one or two modules are being replaced or otherwise re-calibrated using a flood that is larger than the modules. For example, if the modules of the examples of FIG. 8 are square shaped and sized X×X, the flood may be sized approximately (2X)×(2X). (It may be noted that he flood may have sides slightly larger than (2X) to provide a margin of error in positioning the flood.)

For example, map 801 shows a single corner module area 802 corresponding to a single corner module to be replaced, and map 803 shows a local uniformity map 804 including the corner module area 802 and a border area 806, which is shown on its own in map 805. The border area 806 surrounds the single corner module area 802 on 2 sides.

As another example, map 811 shows a module area 812 representing two modules diagonally adjacent to each other to be replaced. Map 813 shows a local uniformity map 814 that includes the module area 812, as well as a border area 816, which is shown on its own in map 815. The border area 816 includes two square portions corresponding to neighboring modules of the modules defining module area 812.

As another example, map 821 shows a module area 822 representing two modules laterally adjacent to each other to be replaced. Map 823 shows a local uniformity map 824 that includes the module area 822, as well as a border area 826, which is shown on its own in map 825. The border area 826 includes two rectangular strips on opposite sides of the module area 822.

As another example, map 831 shows a module area 832 representing two modules laterally adjacent to each other, and positioned in a corner of a detector to be replaced. Map 833 shows a local uniformity map 834 that includes the module area 832, as well as a border area 836, which is shown on its own in map 835. The border area 836 includes a rectangular strip on one side of the module area 822.

Figure 9:
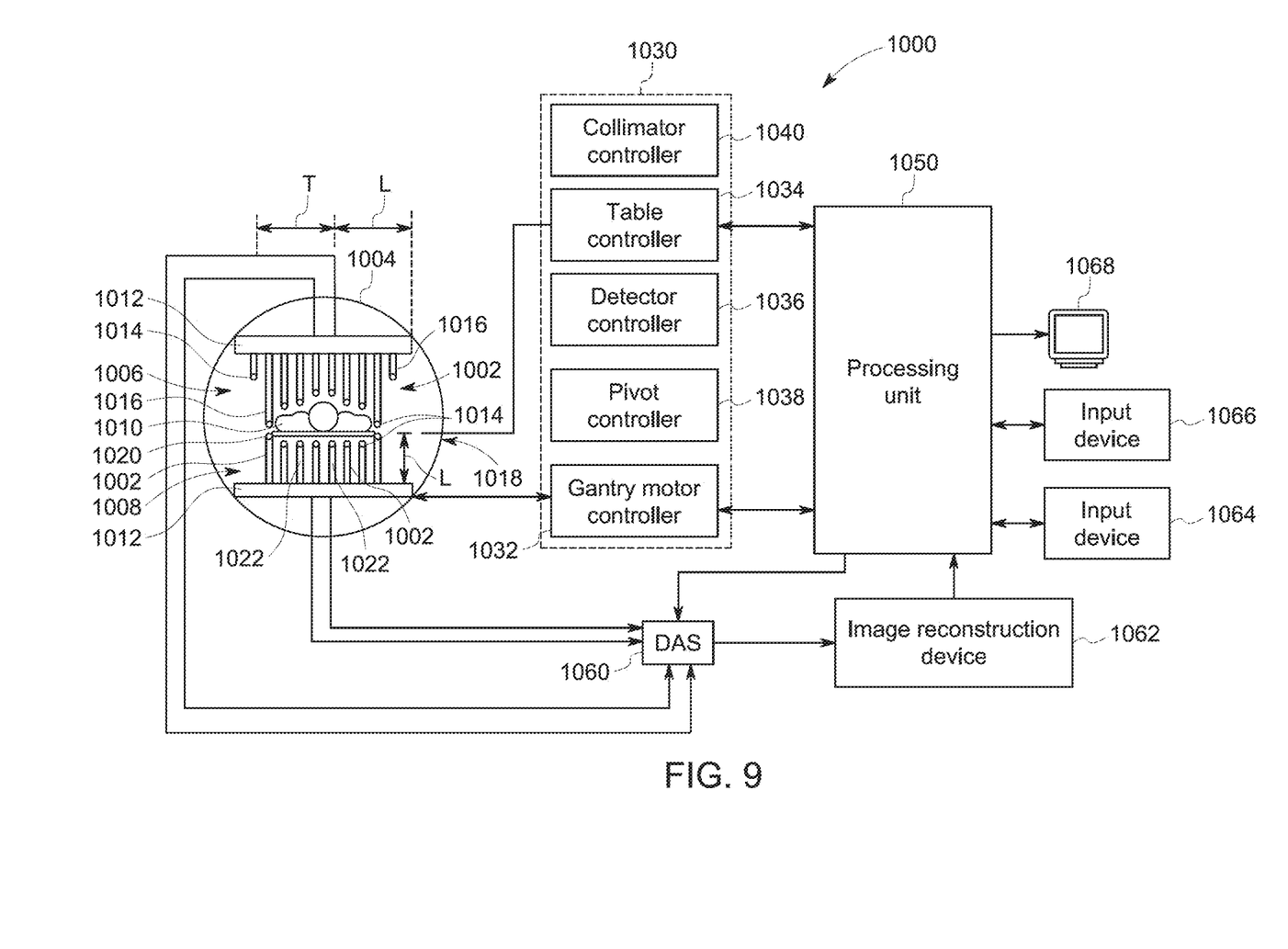
FIG. 9 shows a schematic view of an imaging system, according to an embodiment.

The embodiments described herein may be implemented in medical imaging systems, such as, for example, SPECT, SPECT-CT, SPECT-MR, PET, PET-CT and PET-MR. Various methods and/or systems (and/or aspects thereof) described herein may be implemented using a medical imaging system. For example, FIG. 9 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 9 is provided by way of example for illustrative purposes, and that other arrangements (e.g., detector arrangements) may be employed in various embodiments. In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 9. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 9). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels (pixelated anodes). In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

The collimators 1022 (and detectors) in FIG. 9 are depicted for ease of illustration as single collimators in each detector head. It may be noted that different types of collimators may be used in different columns. Optionally, for embodiments employing one or more parallel-hole collimators, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 9). In various embodiments, the detector controller 1036 may control the detector carriers 1016 or the support members 1012 to move in different lateral directions. Detector controller 1036 may control the swiveling motion of detectors 1002 together with their collimators 1022. In some embodiments, detectors 1002 and collimators 1022 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 9 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

As used herein, the term "computer," "processor," or "module" may include any processor-based or microprocessor-based system including systems using microcontrollers, reduced instruction set computers (RISC), application specific integrated circuits (ASICs), field programmable gate arrays (FPGA's), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for updating a uniformity map of a detector, the detector defining a detector surface area, the method comprising:
   positioning a flood on a sub-portion of the detector surface area of the detector, the flood defining a flood area that is smaller than the detector surface area;
   collecting counts from the flood for the sub-portion of the detector surface area; and
   updating an adjustment portion of the uniformity map using the counts collected for the sub-portion of the detector surface area, wherein the adjustment portion corresponds to at least a part of the sub-portion of the detector surface area.

2. The method of claim 1, wherein the adjustment portion defines an adjustment area that is smaller than the flood area.

3. The method of claim 2, wherein the sub-portion of the detector surface area includes an adjustment portion area and a border area.

4. The method of claim 3, wherein the counts collected include adjustment counts from the adjustment portion area and border counts from the border area, the method further comprising:
   using the border counts to normalize the counts collected for the adjustment portion to provide normalized adjustment portion counts, and
   using the normalized adjustment portion counts to update the adjustment portion of the uniformity map.

5. The method of claim 1, further comprising:
   using the counts collected from the flood to make a local uniformity map;
   normalizing the local uniformity map to provide a normalized local uniformity map; and
   updating the uniformity map by replacing the adjustment portion with the normalized local uniformity map.

6. The method of claim 5, further comprising defining the adjustment portion and a border region at least partially surrounding the adjustment portion, the local uniformity map corresponding to the adjustment portion, wherein the local uniformity map is normalized using counts from the border region.

7. The method of claim 6, wherein the adjustment portion is defined by a known portion of the detector being replaced.

8. The method of claim 6, further comprising excluding at least one of bad pixels or zero pixels from the border region.

9. The method of claim 6, further comprising excluding outermost pixels of the border region.

10. The method of claim 6, further comprising:
    determining original counts for the border region of an original version of the uniformity map;
    determining normalization counts for the border region based on the counts collected from the flood;
    determining adjustment counts for the adjustment portion based on the counts collected from the flood;
    provide normalized adjustment counts by multiplying the adjustment counts for the adjustment portion by a ratio defined by the original counts for the border region divided by the normalization counts for the border region.

11. The method of claim 1, wherein positioning the flood comprises using a region of interest identified on a display operably coupled to the detector.

12. The method of claim 1, wherein the detector comprises a plurality of modules, and the adjustment portion corresponds to at least one module.

13. A method for updating a uniformity map of a detector, the detector defining a detector surface area, the method comprising:
    positioning a flood on a sub-portion of the detector surface area;
    collecting counts from the flood for the sub-portion of the detector surface area;
    using the counts collected from the flood to make a local uniformity map;
    normalizing the local uniformity map to provide a normalized local uniformity map; and
    updating the uniformity map by replacing an adjustment portion of the uniformity map with the normalized local uniformity map.

14. The method of claim 13, further comprising defining the adjustment portion and a border region at least partially surrounding the adjustment portion, the local uniformity map corresponding to the adjustment portion, wherein the local uniformity map is normalized using counts from the border region.

15. The method of claim 14, wherein the adjustment portion is defined by a known portion of the detector being replaced.

16. The method of claim 14, further comprising excluding at least one of bad pixels or zero pixels from the border region.

17. The method of claim 14, further comprising excluding outermost pixels of the border region.

18. The method of claim 14, further comprising:
    determining original counts for the border region of an original version of the uniformity map;
    determining normalization counts for the border region based on the counts collected from the flood;
    determining adjustment counts for the adjustment portion based on the counts collected from the flood;
    provide normalized adjustment counts by multiplying the adjustment counts for the adjustment portion by a ratio defined by the original counts for the border region divided by the normalization counts for the border region.

19. A system comprising:
    a detector defining a detector surface area;
    a flood configured to be disposed proximate the detector, the flood defining a flood area that is smaller than the detector surface area; and
    at least one processor operably coupled to the detector and configured to:
      collect counts from the flood for the sub-portion of the detector surface area; and
      update an adjustment portion of a uniformity map for the detector using the counts collected for the sub-portion of the detector surface area.

20. The system of claim 19, wherein the detector comprises modules defining corresponding portions of the detector surface area, wherein the adjustment portion corresponds to at least one module.

* * * * *